United States Patent
Yoon et al.

(10) Patent No.: US 6,337,764 B1
(45) Date of Patent: Jan. 8, 2002

(54) OPTICAL FIBER AMPLIFIER FOR CONTROLLING GAIN FLATNESS

(75) Inventors: Soo-young Yoon, Yongin; Rae-sung Jung, Suwon; Seong-taek Hwang; Sung-jin Kim, both of Pyeongtaek, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/448,871

(22) Filed: Nov. 24, 1999

(30) Foreign Application Priority Data

Nov. 24, 1998 (KR) .................................. 98-50472

(51) Int. Cl.⁷ ................................................ H01S 3/00
(52) U.S. Cl. ................................. 359/341.41; 359/337.1
(58) Field of Search .............................. 359/194, 337, 359/341, 349

(56) References Cited

U.S. PATENT DOCUMENTS

| | | | |
|---|---|---|---|
| 5,673,129 A | | 9/1997 | Mizrahi ........................ 359/124 |
| 5,768,012 A | | 6/1998 | Zanoni et al. ................ 359/341 |
| 5,808,785 A | * | 9/1998 | Nakabayashi ................ 359/341 |
| 5,808,788 A | * | 9/1998 | Park et al. .................... 356/341 |
| 5,812,710 A | * | 9/1998 | Sugaya ........................... 385/27 |
| 5,822,112 A | * | 10/1998 | Itou et al. .................... 359/341 |
| 5,907,429 A | * | 5/1999 | Sugata ........................... 359/341 |
| 5,912,760 A | * | 6/1999 | Sugiya ......................... 359/341 |
| 5,995,274 A | * | 11/1999 | Sugaya et al. ............... 359/337 |
| 5,995,275 A | * | 11/1999 | Sugaya ......................... 359/341 |
| 6,038,061 A | * | 3/2000 | Sugaya ......................... 359/337 |
| 6,038,062 A | * | 3/2000 | Kosaka ......................... 359/337 |
| 6,064,515 A | * | 5/2000 | Yang ............................ 359/341 |
| 6,067,187 A | * | 5/2000 | Onaka et al. ................. 359/341 |
| 6,108,123 A | * | 8/2000 | Kinoshita .................... 359/337 |

FOREIGN PATENT DOCUMENTS

| | | | | |
|---|---|---|---|---|
| GB | 2317044 | | 11/1998 | ............. H01S/3/06 |
| GB | 2317044 A | * | 11/1998 | ............. H01S/3/06 |
| JP | hei7-244304 | | 9/1995 | ............. G02F/1/35 |
| JP | hei7-123056 | | 4/1996 | .... H01S/3/00 .... |

* cited by examiner

*Primary Examiner*—Thomas H. Tarcza
*Assistant Examiner*—Deandra M. Hughes
(74) *Attorney, Agent, or Firm*—Robert E. Bushnell, Esq.

(57) ABSTRACT

An optical fiber amplifier for controlling gain flatness including an optical fiber amplifying unit for amplifying input signal light according to a predetermined amplification control value, a measuring unit for measuring the power level of amplified spontaneous emission (ASE) at a predetermined wavelength band output from the optical fiber amplifying unit, and a gain controller for controlling the amplification control value of the optical fiber amplifying unit according to the measured power level of the ASE to flatten the gain of the optical fiber amplifying unit. The gain flatness of amplified signal light is monitored and controlled, thereby obtaining gain-flattened signal light even when power level of signal light varies from wavelength to wavelength.

7 Claims, 2 Drawing Sheets

OPTICAL FIBER AMPLIFIER FOR CONTROLLING GAIN FLATNESS

CLAIM OF PRIORITY

This application makes reference to, incorporates the same herein, and claims all benefits accruing under 35 U.S.C §119 from an application entitled Optical Fiber Amplifier For Controlling Gain Flatness earlier filed in the Korean Industrial Property Office on Nov. 24, 1998, and there duly assigned Serial No. 98-50472 by that Office.

BACKGROUND OF THE INVENTION

1. Field of the Invention

The present invention relates to an optical fiber amplifier for controlling gain flatness, and more particularly, to an optical fiber amplifier for controlling gain by measuring the gain flatness thereof.

2. Description of the Related Art

In an optical transmission system, an erbium doped fiber amplifier (EDFA) directly amplifies an optical signal that has been weakened during transmission without converting the optical signal into an electrical signal, thus remarkably extending the transmission distance. U.S. Pat. No. 5,768,012 to Raymond Zanoni et al. entitled Apparatus And Method For The High-Power Pumping Of Fiber Optic Amplifiers and U.S. Pat. No. 5,673,129 to Victor Mizrahi entitled WDM Optical Communication Systems With Wavelength Stabilized Optical Selectors are examples of known optical amplifiers.

Conventional optical fiber amplifiers are optimized to give the highest level of gain flatness before being installed on a transmission path. In an optical fiber amplifier, automatic gain control or automatic level control is achieved by monitoring the power levels of all input signals and the power levels of all output signals.

Due to a change in the signal power level for each channel that is added or dropped during add/drop multiplexing (ADM) as well as a change in loss at each different wavelengths which depends on the properties of an optical fiber used as a transmission path, there exhibits a great difference in the quality of signals of the respective channels received by a reception terminal.

In general, an optical fiber used as a transmission path exhibits a great difference in loss per channel. If a light signal in the wavelength band of 1545.32 to 1557.36 nm, which is generally used in a transmission system having 16 channels at intervals of 100 GHz, is transmitted over e.g., 100 Km, the loss experienced by a light signal in the 1545.32 nm channel is 0.3 dB greater than that experienced by a light signal in the 1557.36 nm channel.

Also, in a network system in which ADM is used, since the output power levels of a typical laser diode are not uniform, it is quite difficult to attain coincidence of power levels between a channel signal transmitted through an ADM node and a channel signal add-multiplexed after being drop-multiplexed.

Thus, since the power level and the signal-to-noise ratio vary greatly between channels of the light signal received by the reception terminal, the signal quality of a channel compared to that as designed may be considerably degraded. If this phenomenon repeatedly occurs, the problem becomes severe.

SUMMARY OF THE INVENTION

To solve the above problems, it is an objective of the present invention to provide an optical fiber amplifier for use in a long-distance transmission system or an add/drop multiplexing (ADM) system, for controlling gain flatness by measuring the gain flatness of an output signal of the optical fiber amplifier and controlling the amplification gain thereof.

Accordingly, to achieve the above objective, there is provided an optical fiber amplifier for controlling gain flatness including an optical fiber amplifying unit for amplifying input signal light according to a predetermined amplification control value, a measuring unit for measuring the power level of amplified spontaneous emission (ASE) at a predetermined wavelength band output from the optical fiber amplifying unit, and a gain controller for controlling the amplification control value of the optical fiber amplifying unit according to the measured power level of the ASE to flatten the gain of the optical fiber amplifying unit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 1:
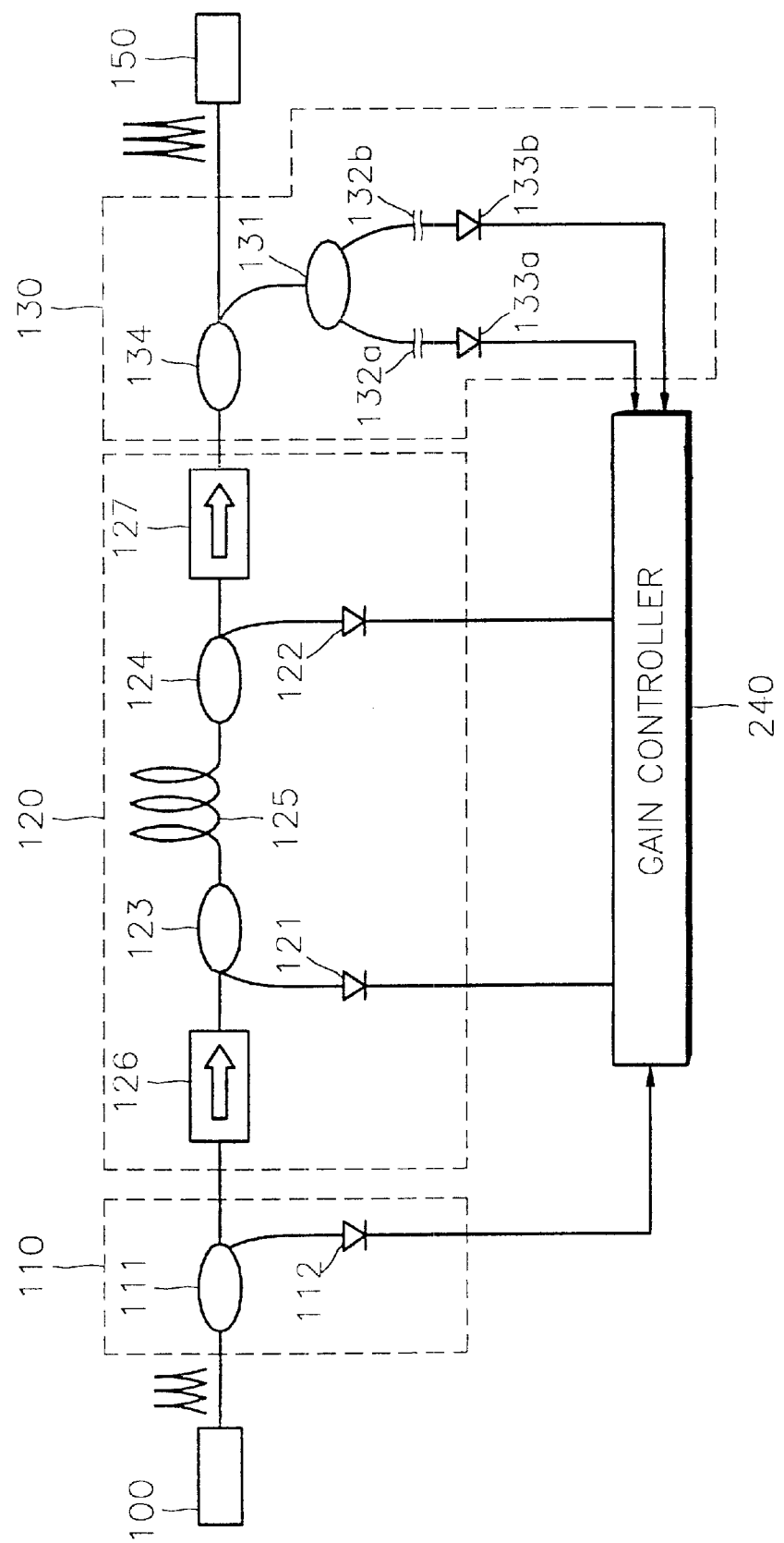
FIG. 1 is a schematic diagram of an optical fiber amplifier for controlling gain flatness according to the present invention.

Referring to FIG. 1, an optical fiber amplifier for controlling gain flatness according to the present invention includes an input port 100, a first measuring unit 110, an optical fiber amplifying unit 120, a second measuring unit 130, a gain controller 240 and an output port 150.

The first measuring unit 110 includes a first light divider 111 for dividing light signals incident from the input port 100 at a predetermined ratio, and a first light receiving element 112 for converting light signals output from the first light divider 111 into electrical signals.

The optical fiber amplifying unit 120 includes first and second pump light sources 121 and 122 for generating pump light, first and second wavelength-division multiplexers 123 and 124 for multiplexing the pump light and signal light, an amplification optical fiber 125 for amplifying the signal light according to the pump light, and first and second isolators 126 and 127 for preventing amplified spontaneous emission (ASE) generated from the amplification optical fiber 125 from being reflected at an input port 100 and an output port 150 and re-entering the amplification optical fiber 125.

The second measuring unit 130 includes a second divider 134 for dividing the signal light amplified by the optical fiber amplifying unit 120, a third light divider 131 for subdividing the signal light divided by the second light divider 134 in a ratio of 1:1, a first filter 132*a* connected to one output port of the third light divider 131, for allowing signal light of a predetermined wavelength band to pass therethrough, a first light receiving element 133*a* for converting signal light output from the first filter 132*a* into an electrical signal and outputting the converted signal to the gain controller 240, a second filter 132*b* connected to the other output port of the third light divider 131, for allowing signal light of a predetermined wavelength band to pass therethrough, and a second light receiving element 133b for converting signal light output from the second filter 132b into an electrical signal and outputting the converted signal to the gain controller 240. Here, the first and second filters 132a and 132b are narrow bandpass filters having different central frequencies so as to be capable of measuring short-wavelength ASE and long-wavelength ASE from the signal light output from the optical fiber amplifying unit 120.

The optical fiber amplifier having the aforementioned configuration operates as follows. The first light divider 111 divides light signals incident from the input port 100 at a predetermined ratio. The first light receiving element 112 converts some of the divided light signal from the input port 100 into an electrical signal and outputs the converted electrical signal to the gain controller 240. The gain controller 240 detects the power level of the input electrical signal. The remaining light signal divided by the first light divider 111 is incident into the amplification optical fiber 125 via the first isolator 126 and the first wavelength-division multiplexer 123. The first and second pump light sources 121 and 122 generate pump light whose power level is controlled according to amplification control values output from the gain controller 240. The amplification optical fiber 125 amplifies the signal light incident from the first wavelength-division multiplexer 123 according to the pump light incident through the first and second wavelength-division couplers 123 and 124.

Figure 2:
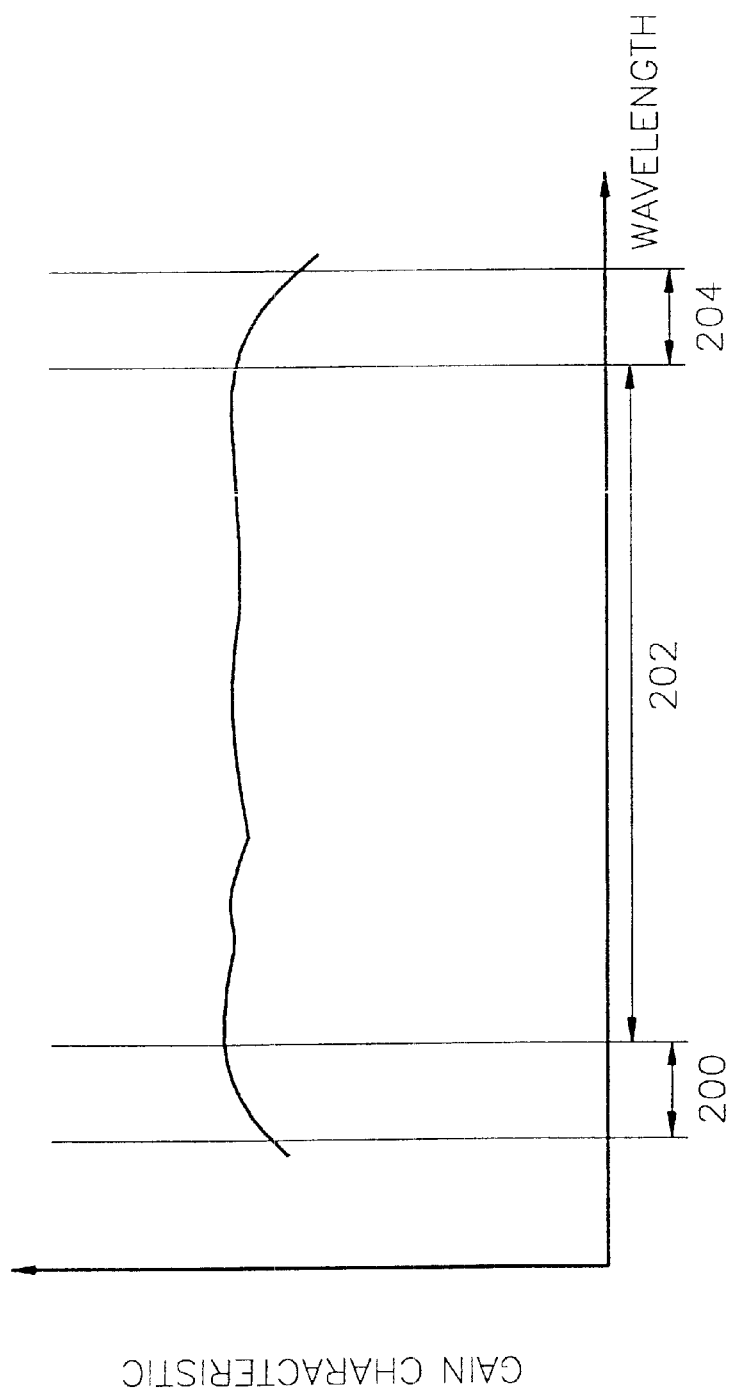
FIG. 2 shows the relationship between the gain characteristics and the wavelength of the first and second filters shown in FIG. 1.

The second light divider 134 divides the amplified signal light at a predetermined ratio and outputs the divided signal light to the output port 150 and the third light divider 131, respectively. The first and second filters 132a and 132b connected to two output ports of the third light divider 131, filter the signal light in a predetermined wavelength band. Here, as shown in FIG. 2, the central wavelengths of the first and second filters 132a and 132b exist properly outside the range of a wavelength region 202 in which a signal channel exists and exist properly inside a wavelength band in which ASE exists. Also, the first and second filters 132a and 132b have central wavelengths which exist outside a wavelength region in which signal channels exist and which exist properly inside a short-wavelength region 200 or a long-wavelength region 204.

The power level of ASE reflects the gain characteristics which are dependent on the wavelengths of the optical fiber amplifying unit 12. Thus, the gain of the optical fiber amplifying unit 120 can be flattened by measuring the power levels of the short- and long-wavelength ASEs and controlling the output power level of the pump light according to the measured power levels.

The second and third light receiving elements 133a and 133b convert signal light filtered by the first and second filters 132a and 132b into electrical signals to then output the electrical signals to the gain controller 240.

The gain controller 240 checks the power level of the ASE from the output signals of the second and third light receiving elements 133a and 133b and supplies amplification control values to the first and second pump light sources 121 and 122 so as to adjust the output power level of the pump light. For example, if the power level of the short-wavelength ASE is greater than any other wavelength ASE, the amplification control value for reducing the power level of the pump light is supplied. If the power level of the long-wavelength ASE is greater than any other wavelength ASE, the amplification control value for increasing the power level of the pump light is supplied.

Also, the gain controller 240 determines the power level of an input light signal by measuring the output signal of the first light receiving element 112, thereby obtaining gain characteristics of the output light signal to the power level of the input light signal.

According to the present invention, the gain flatness of amplified signal light is monitored and controlled, thereby obtaining gain-flattened signal light even when power level of signal light varies from wavelength to wavelength. The optical fiber amplifier according to the present invention can reduce a difference in the transmission characteristic of each channel in a long-distance optical transmission system or an ADM network including ADM, in which optical fibers having a great loss characteristic for each channel are used as transmission paths.

What is claimed is:

1. An optical fiber amplifier for controlling gain flatness comprising:

a first measuring unit for measuring the power level of an input light signal;

an optical fiber amplifying unit for amplifying a light signal, output from said first measuring unit, according to a predetermined amplification control value;

a second measuring unit for measuring the power level of amplified spontaneous emission within two predetermined wavelength bands output from the optical fiber amplifying unit, said two predetermined wavelength bands comprising:

a short-wavelength region outside a wavelength region in which any signal channels exist, and a long-wavelength region outside said wavelength region in which any signal channel exists; and a gain controller for obtaining gain characteristics of an output signal light of the optical fiber amplifying unit according to the measured power level of said input light signal, and for controlling the amplification control value of the optical fiber amplifying unit according to the measured power level of the amplified spontaneous emission to flatten the gain of the optical fiber amplifying unit.

2. The optical fiber amplifier according to claim 1, wherein said first measuring unit comprises:

a light divider for dividing the input signal light into first and second light portions at a predetermined ratio, the first light portion being provided to said optical fiber amplifying unit; and an light receiving element for converting the second light portion into an electrical signal, said electrical signal being input to said gain controller.

3. The optical fiber amplifier according to claim 1, wherein the second measuring unit comprises:

a first light divider for dividing the output signal light of the optical fiber amplifying unit at a predetermined ratio into a first light portion and a second light portion, said first light portion of the light signal divided by the first light divider being provided to an output port as said output signal light;

a second light divider for sub-dividing the second light portion of the light signal divided by the first light divider at a second predetermined ratio;

a first filter for filtering the amplified spontaneous emission of a first predetermined wavelength band having said short-wavelength region from one output of the second light divider;

a first light receiving element for converting the output signal of the first filter into a first electrical signal and outputting the first electrical signal to the gain controller;

a second filter for filtering the amplified spontaneous emission of a second predetermined wavelength band having said long-wavelength region from the other output of the second light divider; and a second light receiving element for converting the output signal of the second filter into a second electrical signal and outputting the second electrical signal to the gain controller.

4. The optical fiber amplifier according to claim 3, wherein said first measuring unit comprises:

a third light divider for dividing the input signal light into a first light signal and a second light signal at a predetermined ratio, the first light signal being provided to said optical fiber amplifying unit; and an third light receiving element for converting the second light signal into a third electrical signal, said third electrical signal being input to said gain controller.

5. The optical fiber amplifier according to claim 4, said optical fiber amplifying unit comprising:

a first optical isolator coupled to receive the first light signal output from said third light divider;

a first pump light source for generating a first pump light in response to a first gain control signal output from said gain controller;

a first wavelength-division multiplexer for multiplexing said first pump light and said first light portion output from said first optical isolator;

an amplification optical fiber for amplifying the signal light according to received pump light;

a second pump light source for generating a second pump light in response to a second gain control signal output from said gain controller;

a second wavelength-division multiplexer for multiplexing said second pump light and a signal light output from said amplification optical fiber; and a second optical isolator coupled to receive light signals output from said second wavelength-division multiplexer, said first and second optical isolators preventing the amplified spontaneous emission generated from the amplification optical fiber from being reflected at an input port and at said output port and re-entering the amplification optical fiber.

6. An optical fiber amplifier for controlling gain flatness comprising:

an input port for receiving the input signal light;

an optical coupler for dividing the input signal light into first and second light portions at a predetermined ratio;

an optical converter for converting the second light portion into a first electrical signal;

an optical fiber amplifying unit for amplifying input signal light according to a predetermined amplification control value;

a measuring unit for measuring the power level of amplified spontaneous emission at predetermined wavelength bands output from the optical fiber amplifying unit, wherein the measuring unit comprises:

a first light divider for dividing the output signal light of the optical fiber amplifying unit at a predetermined ratio into a third light portion and a fourth light portion;

an output port for passing said third light portion of the light signal divided by the first light divider as an output light signal;

a second light divider for sub-dividing the fourth light portion of the light signal divided by the first light divider at a second predetermined ratio;

a first filter for filtering the amplified spontaneous emission of a first predetermined wavelength band having a short-wavelength from one output of the second light divider, a central wavelength of the first filter existing inside said first predetermined wavelength band and outside a wavelength region in which any signal channels exist;

a first light receiving element for converting the output signal of the first filter into a second electrical signal and outputting the second electrical signal;

a second filter for filtering the amplified spontaneous emission of a second predetermined wavelength band having a long-wavelength from another output of the second light divider, a central wavelength of the second filter existing inside said second predetermined wavelength band and outside said wavelength region in which any signal channels exist; and a second light receiving element for converting the output signal of the second filter into a third electrical signal and outputting the third electrical signal; and a gain controller, said first electrical signal being input to said gain controller to obtain gain characteristics of the output light signal to the power level of the input light signal, said gain controller being responsive to said second electrical signal and said third electrical signal for controlling the amplification control value of the optical fiber amplifying unit according to the measured power level of the amplified spontaneous emission to flatten the gain of the optical fiber amplifying unit.

7. The optical fiber amplifier according to claim 6, said optical fiber amplifying unit comprising:

a first optical isolator coupled to receive the first light portion output from said optical coupler;

a first pump light source for generating a first pump light in response to a first gain control signal output from said gain controller;

a first wavelength-division multiplexer for multiplexing said first pump light and said first light portion output from said first optical isolator;

an amplification optical fiber for amplifying the signal light according to received pump light;

a second pump light source for generating a second pump light in response to a second gain control signal output from said gain controller;

a second wavelength-division multiplexer for multiplexing said second pump light and a signal light output from said amplification optical fiber; and a second optical isolator coupled to receive light signals output from said second wavelength-division multiplexer, said first and second optical isolators preventing the amplified spontaneous emission generated from the amplification optical fiber from being reflected at said input port and at said output port and re-entering the amplification optical fiber.

* * * * *